United States Patent

Kotte et al.

Patent Number: 5,554,325
Date of Patent: Sep. 10, 1996

[54] PROCESS AND DEVICE FOR EXTRUDING A CALIBRATED PROFILE OF A THERMOPLASTIC POLYMER ONTO ARTICLES

[75] Inventors: Rolf Kotte, Alsdorf-Begau; Gerd Cornils; Thomas Stumpe, both of Merzenich, all of Germany

[73] Assignee: Saint Gobain Vitrage International, Courbevoie, France

[21] Appl. No.: 239,572

[22] Filed: May 9, 1994

[30] Foreign Application Priority Data

May 10, 1993 [DE] Germany .......................... 43 15 469.7

[51] Int. Cl.$^6$ .......................... B29C 47/02; B29C 47/30
[52] U.S. Cl. .......................... 264/37; 156/107; 156/108; 264/141; 264/177.16; 264/252; 425/145; 425/146; 425/217
[58] Field of Search .......................... 264/37, 252, 141, 264/177.16–.20; 156/107–109, 244.25; 425/145, 217, 146

[56] References Cited

U.S. PATENT DOCUMENTS

| | | | |
|---|---|---|---|
| 3,589,163 | 6/1971 | Byrne | 425/185 |
| 4,066,097 | 1/1978 | Fritsch . | |
| 4,108,588 | 8/1978 | Fritsch | 425/190 |
| 4,519,962 | 5/1985 | Schlienkamp | 425/145 |
| 4,756,858 | 7/1988 | Reifenhäuser et al. | 264/37 |
| 4,925,381 | 5/1990 | Aoki et al. | 425/145 |
| 4,957,572 | 9/1990 | Dewitte et al. | 156/109 |
| 5,162,090 | 11/1992 | Arima | 264/177.16 |
| 5,219,588 | 6/1993 | England et al. | 425/146 |
| 5,336,349 | 8/1994 | Cornils et al. . | |
| 5,358,397 | 10/1994 | Ligon et al. | 264/177.19 |
| 5,382,395 | 1/1995 | Hoenke | 264/177.19 |
| 5,445,780 | 8/1995 | Yada et al. | 156/108 |

FOREIGN PATENT DOCUMENTS

| | | | |
|---|---|---|---|
| 0524092 | 7/1992 | European Pat. Off. . | |
| 0524092A1 | 1/1993 | European Pat. Off. . | |
| 2444012B1 | 9/1974 | Germany . | |
| 2444012 | 1/1976 | Germany . | |
| 2609278 | 9/1977 | Germany | 156/500 |
| 3616444 | 11/1987 | Germany | 264/37 |
| 57-72837 | 5/1982 | Japan | 264/37 |
| 62-179915 | 8/1987 | Japan | 264/37 |

*Primary Examiner*—Jeffery R. Thurlow
*Attorney, Agent, or Firm*—Pennie & Edmonds

[57] ABSTRACT

For the extrusion of a calibrated profile of a thermoplastic polymer onto articles, the polymer, which is melted in an extruder (17), is fed, via a heated pressure hose (22), to an extruder head guided by a robot (5) and, by means of said extruder head, extruded and deposited on the article. At the end of each extrusion operation, the material flow to the extruder head is maintained and, by means of a change-over valve within the extruder head, redirected into an outlet orifice provided in the vicinity of the die orifice until the commencement of the subsequent extrusion operation. The redirected material flow emerges from a pipe connector (29) which is arranged on the extruder head and is coupled to a coupling piece (33). The material collected in this manner may be pelletized and fed back to the feed hopper (16) of the extruder (17).

13 Claims, 6 Drawing Sheets

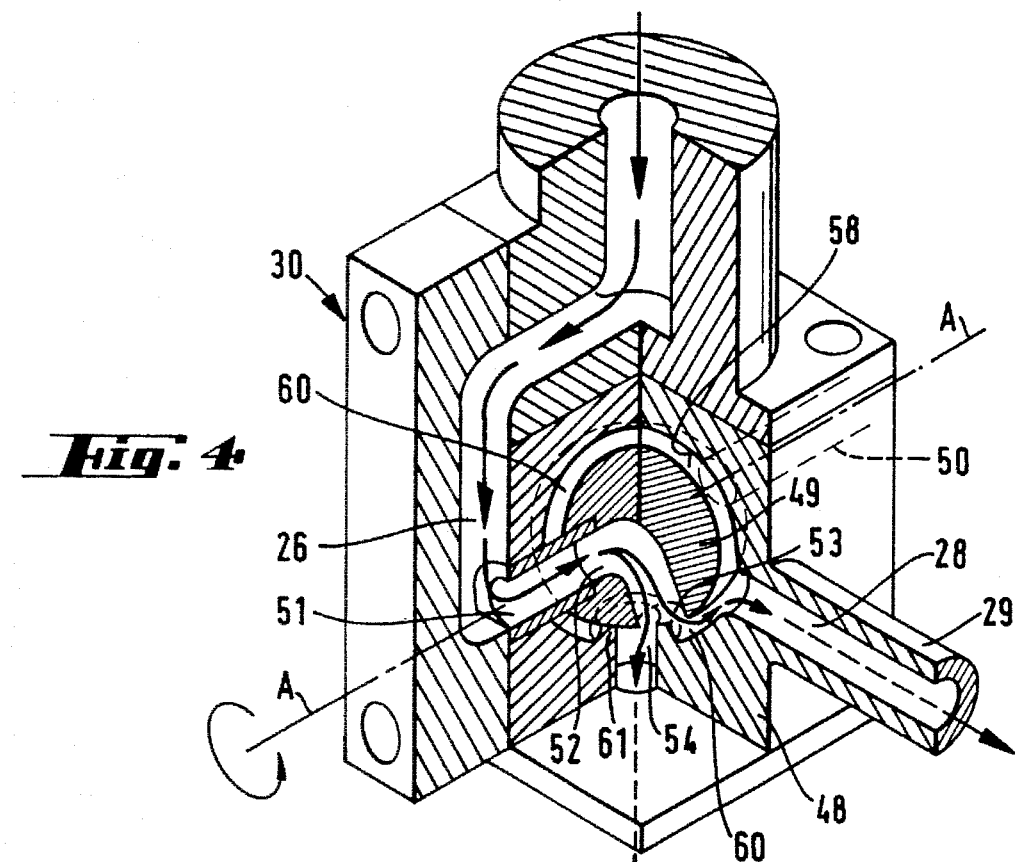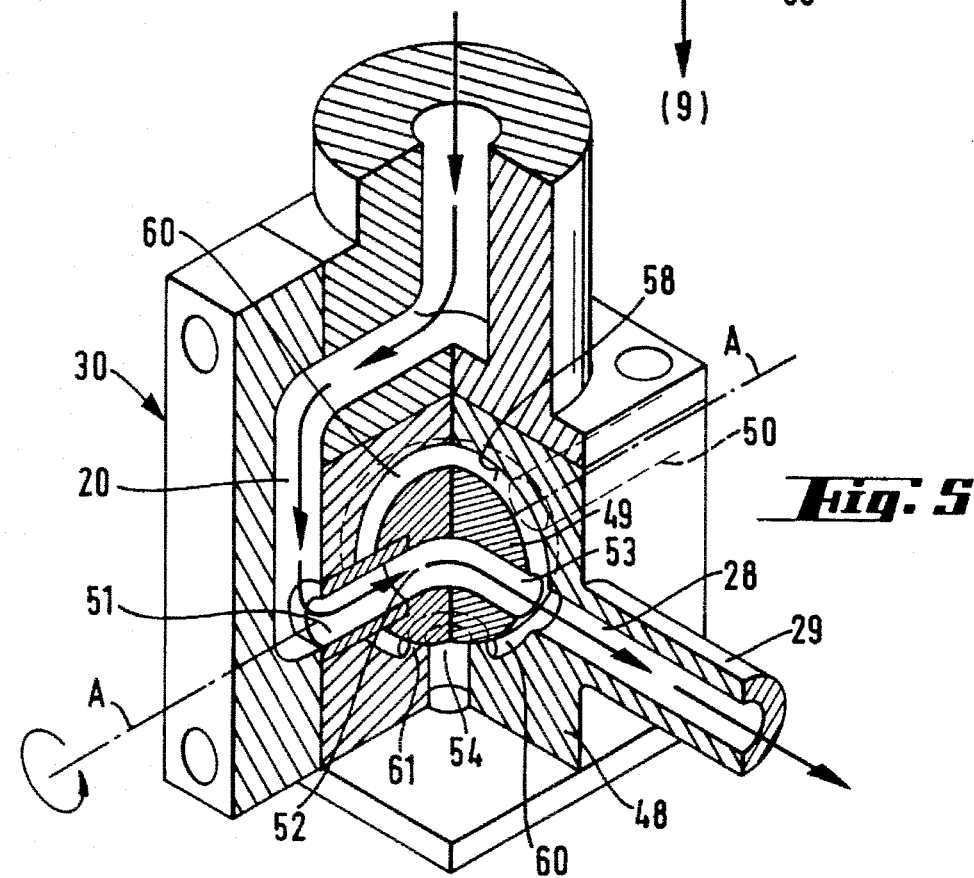

ial, 5,554,325

PROCESS AND DEVICE FOR EXTRUDING A CALIBRATED PROFILE OF A THERMOPLASTIC POLYMER ONTO ARTICLES

BACKGROUND OF THE INVENTION

1. Field of the Invention

The present invention relates to a process for extruding a calibrated profile of a thermoplastic polymer onto articles, the articles being positioned in the processing region of an automatic handling unit. The polymer melted in an extruder is fed, via a heated pressure hose, to a heated extruder head which is guided by the automatic handling unit and provided with an extrusion die, and is extruded and deposited on the articles. The invention further relates to suitable devices for carrying out this process.

2. Discussion of the Background

A process of this kind is described in EP 0 524 092 A1 for extruding a frame or a frame part onto a glass pane. From this document, it is also known, by means of this process, to apply profiles of a thermoplastic polymer, in particular of a thermoplastic elastomer, onto other articles, for example as sealing profiles on car doors, boot lids or sunroofs, and as sealing profiles or frame profiles onto articles of any other kind.

In the known process, after completion of the extrusion operation onto an article, before or during the lifting of the extruder head from the article, the volume flow of the melted polymer is interrupted by controlling the drive motor of the extruder and is only brought back into operation when, after the positioning of the next article, the extruder head has been lowered almost onto the article and has commenced its travel over the article.

This mode of operation in which the volume flow in the system is interrupted during the time span in which the articles are changed on the processing table is not free of disadvantages. Because of the inertia of the system a certain elastic deformability of the melted material and the heated hose under high pressure, and because of the melting and metering behavior of the extruder, irregularities occur in such discontinuous operation, which may lead to defective profiles and to a defective operation of the process.

SUMMARY OF THE INVENTION

The invention has as an object the further development of the aforementioned process in such a manner that the production reliability of the process is increased, the production cycle is shortened and the quality of the extruded profile is improved overall.

In accordance with the invention, at the end of each extrusion operation, during lifting of the extruder head from this article, the material flow within the pressure hose is maintained without interruption and, until the commencement of the subsequent extrusion operation, is directed through an outlet orifice provided in the extruder head in the vicinity of the extrusion die, and so is discharged out of the extruder head.

By virtue of the process according to the invention, a continuous operation of the extruder is maintained, so that steady-state process conditions may be established, which are not interrupted and do not undergo changes. In particular, a uniform temperature behavior, melting behavior and metering behavior of the extruder and a uniform pressure and a uniform volume flow rate in the system as a whole are achieved by this means. As a consequence of this constancy of all essential process parameters, a profile with the defined desired cross-section is produced right from the commencement of each extrusion process, and even at the end of the extrusion process on an article, the extruded profile largely retains its defined cross-section.

The material flow which leaves the extruder head between the actual extrusion operations may be discarded. However, this material directed away from the extruder head is expediently reclaimed and may be fed back to the extruder. This may be done, for example, by feeding the material emerging from the orifice in the extruder head in the molten state directly back into the extruder through a heated pipe, with the aid of a pump. Another possibility for reclaiming the material consists in pelletizing the material again after its emergence from the orifice in the extruder head and feeding the pellets thus obtained back to the extruder, for example via a pneumatic conveying system. The pellets may, of course, also be first stored and fed back to the process at a later time, or, if appropriate, may also be used for another purpose.

In carrying out the process according to the invention, care should also be taken that the flow resistance in the two different flow paths of the material, namely in the path from the extruder, via the pressure hose, to the extrusion die sliding over the glass surface, and the path from the extruder, via the pressure hose, to the outlet point from the bypass pipeline of the material guided in the bypass, is the same. This means, for example, that the flow cross-sections of the lines, the temperature of the lines and the conveying of the material profile within the bypass line by means of pumps, have to be correspondingly set and matched to one another to fulfil this condition at least to a large extent.

A device suitable for carrying out the process according to the invention comprises an automatic handling unit, an extruder head which is guided by said automatic handling unit and has an electrically heated extrusion die, an extruder, a pressure hose connecting the extruder to the heated extrusion die and a central control unit controlling the automatic handling unit and the process sequence. The device is characterized in that the extruder head is provided, in the vicinity of the die, with an outlet orifice for the material flow and with a change-over valve controlled by the control unit for diverting the material flow from the die into the outlet orifice and vice versa.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 shows the change-over valve shown in FIG. 3 in a position at the commencement of the change-over process;

FIG. 5 shows the change-over valve shown in FIG. 3 in the end position after the change-over process;

DESCRIPTION OF THE PREFERRED EMBODIMENTS

Figure 1:
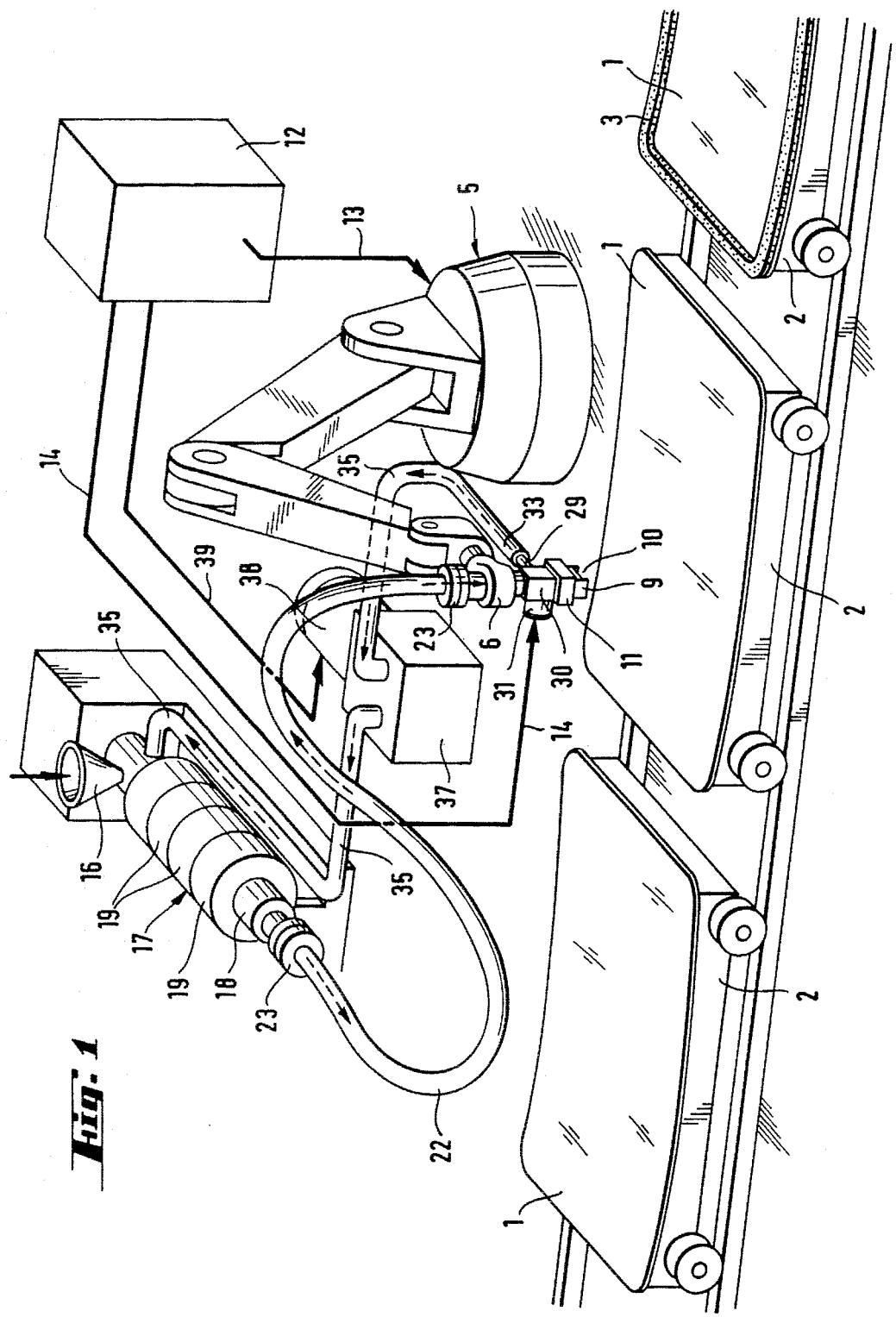
FIG. 1 shows a system for carrying out the process with feedback of the melted material flow.

The drawings show, as the articles onto which the profile is extruded, a plurality of essentially rectangular, curved glass panes 1, onto the edge of which a frame-like profile of a thermoplastic elastomer is extruded. As already mentioned at the outset, however, the process may also be used for numerous other purposes which are not discussed in detail.

The glass panes 1, which are to be provided with a frame-shaped profile 3 on the edge, are mounted on movable supports 2 and are moved successively into the processing station in which the profile 3 is to be extruded thereon. The glass panes are carefully prepared in a preceding work station, not shown, by cleaning their surfaces in the region in which the profile is to be extruded and by coating them with a suitable adhesion-promoter system.

In the processing station in which the profile 3 is extruded, there is disposed a robot 5 on whose manipulator head 6 is mounted an extruder head with an extrusion die 9 having a calibrated die orifice 10. In this processing station, the glass pane 1 to be processed is carefully positioned. As soon as the glass pane 1 has assumed its exact position, the extruder head is guided along the edge of the glass pane 1 by the robot 5 according to a predetermined travel program. In this operation, the robot 5 is controlled by a central control unit 12, via the control line 13.

By means of the extrusion die 9 guided by the robot 5, a thermoplastic elastomer is extruded onto the glass panes 1, which, if appropriate, are previously heated to a suitable temperature. The extrusion die 9 is provided with an electrical heating element 11, by means of which the die body is heated to the temperature necessary for extrusion of the thermoplastic polymer.

The thermoplastic polymer to be extruded is introduced as pellets into the feed hopper 16 of the screw extruder 17, is melted in the latter and is fed to the extruder head under high pressure. The barrel 18, containing the screw of the screw 17 is surrounded by a plurality of heating rings 19 which heat the barrel 18, including the screw rotating in it, to the required temperature.

The connection between the barrel 18 of the extruder 17 and the extruder head is formed by an electrically heated high-pressure hose 22. The high-pressure hose 22 has to be equipped to withstand pressures of approximately 250 bar at the operating temperature. On the other hand it has to be sufficiently flexible to be able to follow the movements of the extruder head. A pivotable pipe joint 23 is expediently interposed at the start and end of the hose 22 in each case, avoiding torsional forces being transmitted to the extruder head during the circulation of the extruder head around the glass pane during extrusion.

Figure 3:
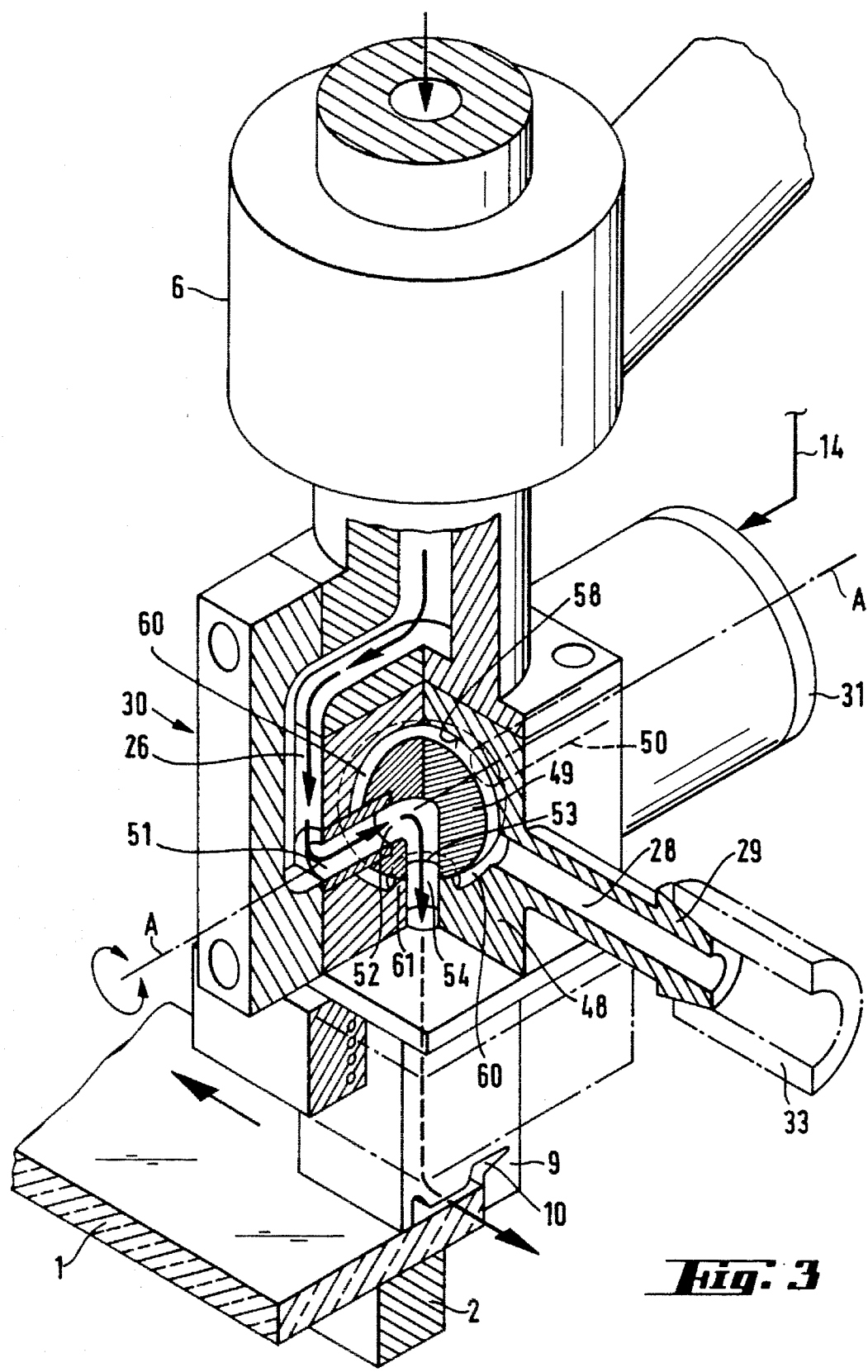
FIG. 3 shows an extruder head with a first embodiment of a change-over valve suitable for carrying out the process.

As can be seen from FIG. 3 in detail, an outlet orifice 28 for the material flow is provided laterally on the extruder head. At this outlet orifice 28, a pipe connector 29 is connected. On the extruder head there is arranged a three-way valve 30 which can be pivoted by a positioning motor 31 between two end positions. In the end position shown in the drawing, the volume flow entering through channel 26 is directed through a second flow path into the extrusion die 9, from where it emerges through the die orifice 10. In the other end position, the connection to the extrusion die 9 is interrupted. Instead, the channel 26 is then connected via a first flow path to the outlet channel 28 so that, with the three-way valve 30 in this position, the material flow emerges from the pipe connector 29. The change-over of the three-way valve 30 by the positioning motor 31 is carried out by the central control unit 12, via the control line 14, at the instant at which the extrusion of the profile 3 onto the glass pane 1 is completed and the extruder head is lifted from the glass pane 1.

The flow channel for the material flow in the extruder head, through the three-way valve 30 as far as the aperture of the pipe connector 29, should expediently be dimensioned such that the pressure loss occurring during flow through this channel corresponds to the pressure loss established during flow through the die. In this manner, optimum conditions are achieved.

Directly after the change-over of the three-way valve 30 at the end of the extrusion operation, the extruder head is moved into a defined resting position above the glass pane 1, the pipe connector 29 being coupled to a coupling piece 33. The material flow emerging from the pipe connector 29 flows through the coupling piece 33 into a pipeline contiguous therewith and is fed back to the extruder 17.

In the case of the embodiment shown in FIG. 1, a heated pipeline 35 is connected to the coupling piece 33. The pipeline 35 is held, by means of a suitable heating coil, at a temperature at which the material flow in the pipe remains in the molten state, so that it can flow within the pipeline 35 into the extruder 17. To maintain the flow of the material in the pipeline system 35, for example, a gear wheel pump 37, which is driven by the motor 38 is provided in the pipeline system. The drive motor 38 is controlled by the central control unit 12, via the control line 39, such that the material flow in the pipeline 35 is conveyed as long as the extruder head with the pipe connector 29 is coupled to the coupling piece 33.

Figure 2:
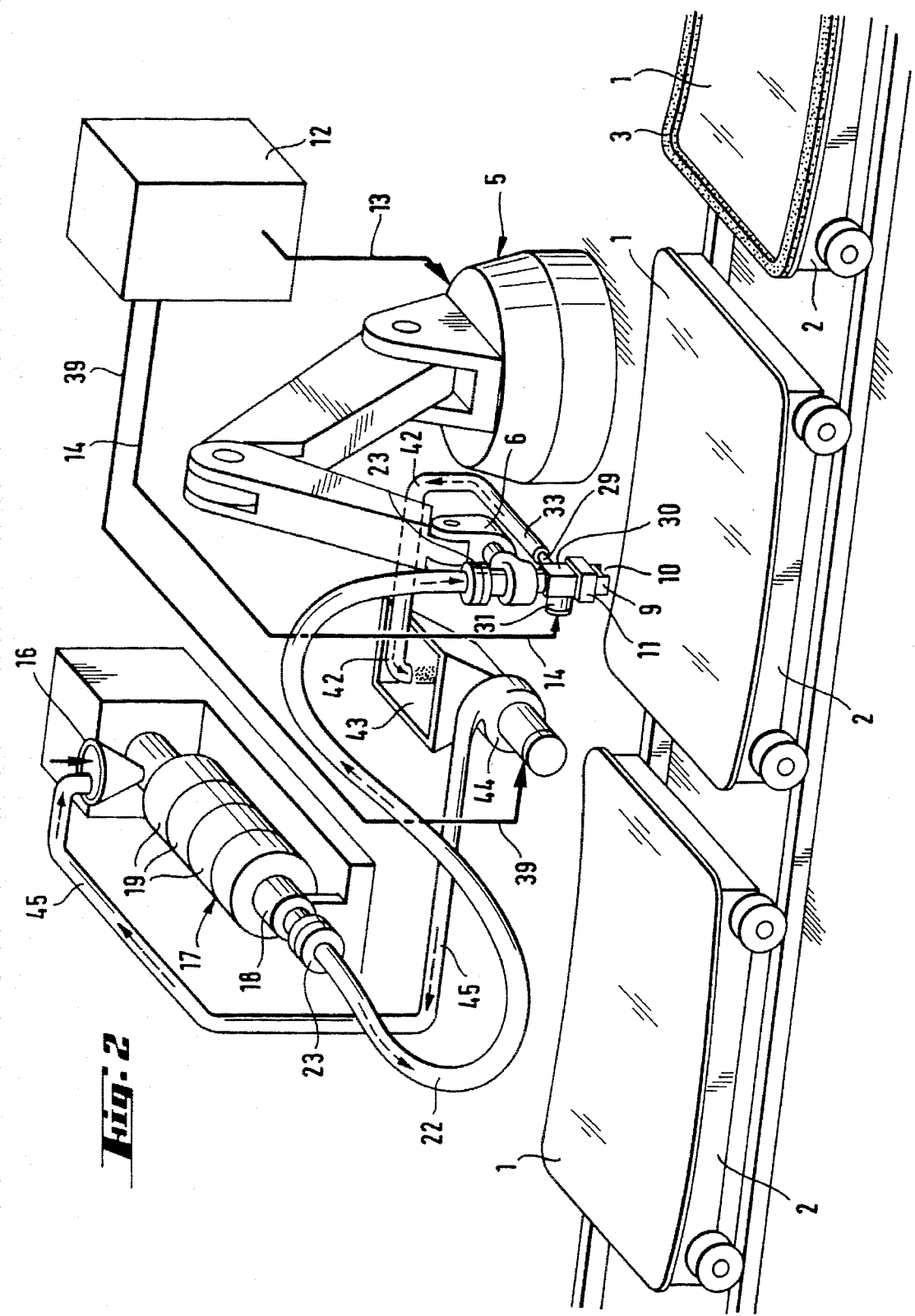
FIG. 2 shows a system for carrying out the process with feedback of the material after pelletizing.

In the embodiment shown in FIG. 2, the system for extruding the profile of thermoplastic polymer is the same as that in the exemplary embodiment described with reference to FIG. 1. Reference is thus again made to the description of FIGS. 1 and 2. A heated pipe 42 is connected to the coupling piece 33 to which the pipe connector 29 is coupled with the extruder head in the resting position. The heated pipe 42 opens above a feed hopper 43. The thermoplastic material emerges from the pipe 42 in the pelletized form and drops into the hopper 43. Below the hopper 43, there is arranged a fan 44 which conveys the pellets pneumatically through the pipeline 45 into the feed hopper 16 of the extruder 17, where they are remelted and used for the extrusion of the profile.

Thermoplastic elastomers that have proven particularly suitable for the described process are, in particular, thermoplastic polyolefin elastomers of isotactic propylene and ethylene-propylene-diene rubber, such as are commercially available under the name SANTOPRENE.

As already mentioned, because of the high pressures in the extrusion system and because of the elastic properties of the pressure hose 22 and the thermoplastic elastomer, it is important to control the change-over process in the change-over valve 13 such that, during the change-over of the valve, no pressure surges occur in the system. If, during the change-over phase, an interruption, even if only very brief, of the material flow in the change-over valve occurs, because of the continuous material-conveying by the screw of the extruder 17, an increase of the pressure in the pressure hose 22 instantaneously occurs, which leads to a slight elastic extension of the hose 22 and a slight elastic compression of the polymer in the hose. At the beginning of the extrusion process of the profile on the next glass pane 1, an undefined material accumulation at the commencement of the profile briefly occurs as a consequence of the increased pressure. This makes impossible a reproducible subsequent post-forming during the transition region between the beginning of an extrusion step and the end of the extrusion onto the previous profile, which is expediently carried out in an automated process.

To avoid this disadvantage, the change-over valve 30 is therefore designed such that, during the change-over process, the occurrence of pressure surges of this kind is reliably avoided. Two different embodiments of a three-way value suitable for this purpose are shown in FIGS. 3 to 8 and are briefly described below.

In the embodiment of the change-over valve 30 shown in FIGS. 3 to 5, a spherical plug 49 is mounted within the valve housing 48 so as to be pivotable about the axis A—A by its connection at one side to the rotating spindle 50 of the positioning motor 31. At the other side it has a tubular pivot pin 51 which is mounted in the housing 48. The front opening of the tubular pivot pin 51 is connected to the inlet channel 26 for the material flow, so that the material flow through the pivot pin 26 enters the channel 52 of the plug 49. The channel 52 in the plug 49 is bent at right angles within the plug 49 and, in the angular position of plug 49 shown in FIG. 3, the outlet orifice 53 of the channel 52 is located precisely above the bore 54 in the valve housing 48. Bore 54 forms the feed channel to the extrusion die 9.

The spherical hollow space 58 in the valve housing 48 has a larger diameter than the spherical plug 49, so that a spherical-shell-shaped hollow space 60 is formed between plug 49 and the wall of the housing 48. Only above the bore 54 is there an annular shoulder 61, which, at this point, serves for sealing the channel 54 with respect to the plug 49. In the position of plug 49 shown in FIG. 3, the material flow through the channel 52 is directed completely into the extrusion die 9.

As seen in detail from FIG. 4, during the pivot movement of the plug 49, the material flow is not interrupted. While a part of the outlet orifice 53 is still connected to the bore 54, another part of the outlet orifice 53 has already left the sealing surface of the annular shoulder 61 and opens into the spherical-shell-shaped hollow space 60, which is connected to the outlet channel 28. To the extent to which the inlet orifice of the bore 54 is closed, the material flow is in this manner directed without interruption via the hollow space 60 into the outlet channel 28. In the end position which can be seen in FIG. 5, the outlet orifice 53 of the plug 49 is finally located directly opposite the inlet orifice of the channel 28, whereas the inlet orifice of the bore 54 is completely closed.

Figure 6:
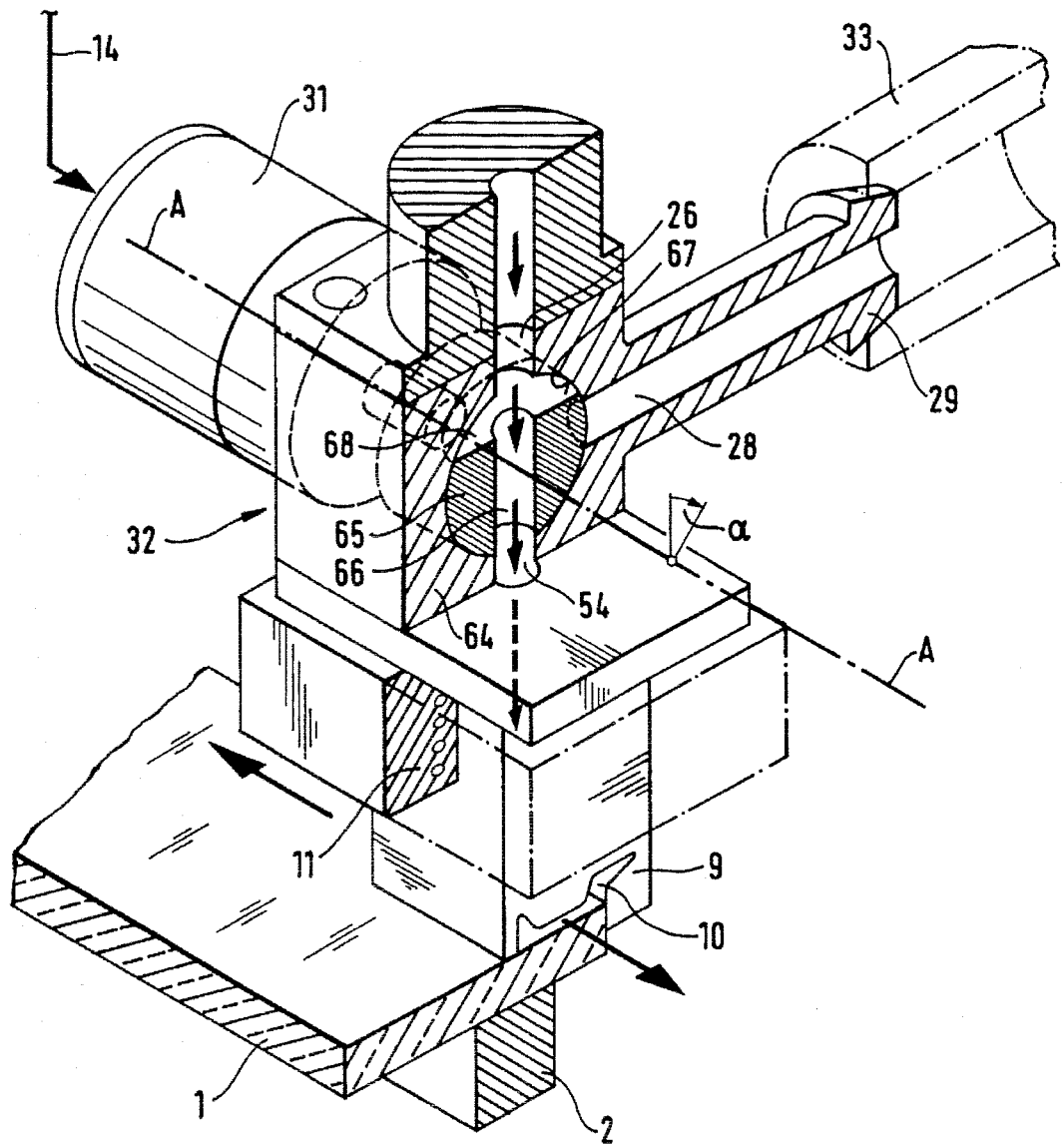
FIG. 6 shows an extruder head with a different embodiment of a change-over valve suitable for carrying out the process.
Figure 7:
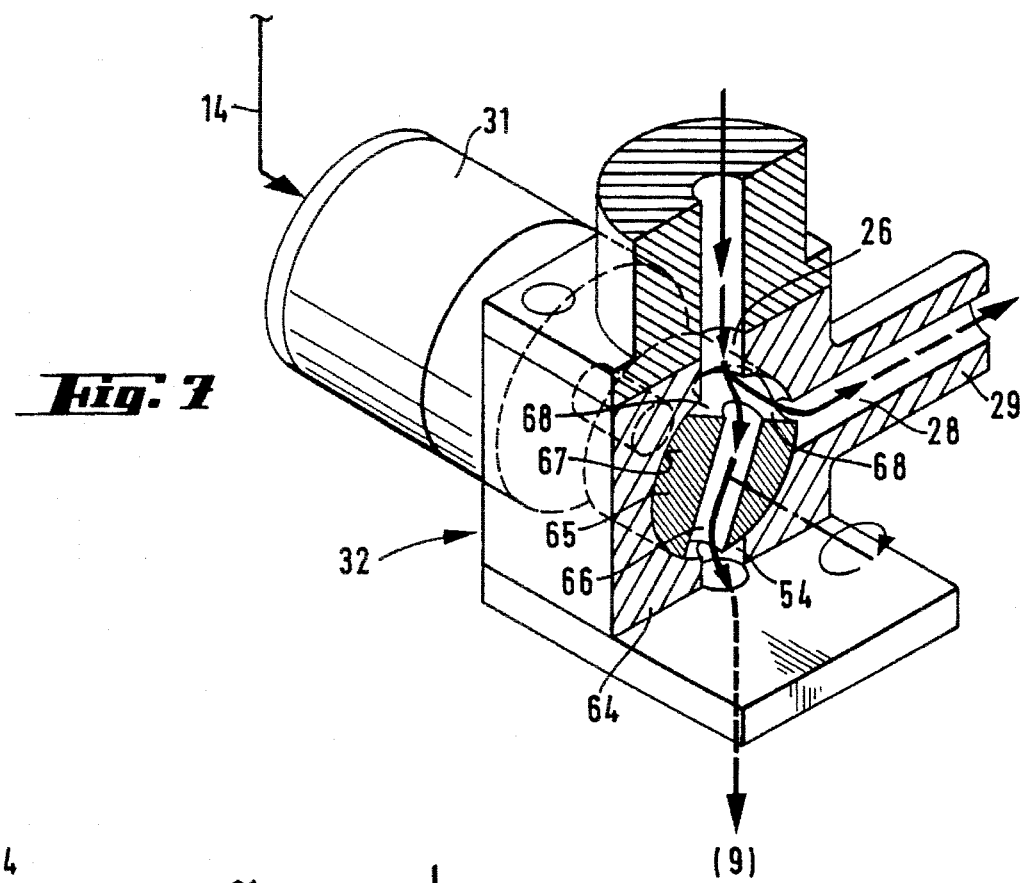
FIG. 7 shows the change-over valve shown in FIG. 6 in a position at the commencement of the change-over process.
Figure 8:
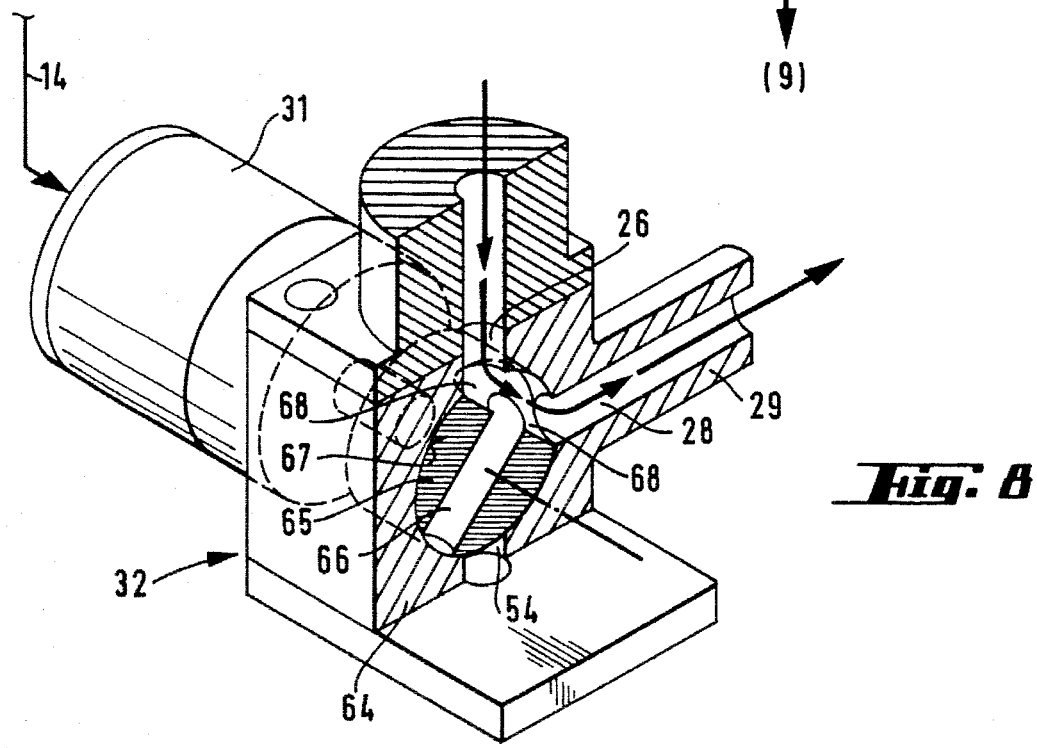
FIG. 8 shows the change-over valve shown in FIG. 7 in the end position after the change-over process.

The same effect is achieved with a change-over valve 32 as is shown in FIGS. 6 to 8. In this case the inlet channel 26, opening into the valve housing 64, for the thermoplastic material to be extruded is located vertically above the cylindrical plug 65, specifically in a vertical extension of the bore 54, through which the material flows to the extrusion die 9. The plug 65 is correspondingly provided with a continuous bore 66 which, in the position shown in FIG. 6, connects the inlet channel 26 to the outlet bore 54. The plug 65 is pivoted by means of the positioning motor 31 about the pivot axis A—A through a given angle α.

At the inlet end for the material being extruded, the plug 65 is flattened or provided with a channel 68 which is open at the top and extends at right angles to the bore 66. In the position shown in FIG. 6, this channel 68 is closed by the inner wall 67 of the housing 64, so that the material entering the housing through the channel 26 can only flow through the bore 66.

Directly after commencement of the change-over process, however, as can be seen in detail in FIG. 7, to the extent to which the flow cross-section between the bore 66 and the bore 54 is reduced by the pivot movement of the plug 65, the opening of channel 68 is enlarged with respect to the lateral outlet channel 28, so that the material flow flowing through the inlet channel 26 flows on unchanged through the channel 68 into the outlet channel 28. In the end position of the plug 65, as is shown in FIG. 8, the channel 68 completely connects the inlet channel 26 to the outlet channel 28, whereas the material flow to the outlet bore 54 is completely interrupted. The material being extruded is now fed, via the pipe connector 29 and the pipelines connected thereto, back into the extruder 17.

When the next extrusion operation commences, the plug 65 is pivoted by the positioning motor 31 in the opposite direction. The connection to the outlet opening 54 and thus to the extrusion die 9 is thus again formed, and again without interruption of the material flow.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A process for extruding a calibrated profile of a thermoplastic polymer onto an article positioned in a processing region of an automatic handling unit, comprising the steps of:

feeding a melted polymer to a heated extruder head having an extrusion die;

extruding the melted polymer from the extruder head while guiding the extruder head along a surface of the article;

lifting the extruder head from the article after completion of said extruding step; and maintaining, without interruption, the feeding of the melted polymer to the extruder head during said lifting step and unit commencement of a subsequent second feeding step by discharging the melted polymer out of the extruder head via an outlet orifice other than said extrusion die, the pressure loss during discharge through said outlet orifice of said extruder head being substantially equal to the pressure loss during discharge through said extrusion die so that the melted polymer fed to the extruder head is substantially directed to said outlet orifice, said outlet orifice being provided in the extruder head and in the vicinity of the extrusion die.

2. The process of claim 1 including the step of recycling the polymer discharged through the outlet orifice.

3. The process of claim 2 wherein said recycling step comprises heating and pumping the polymer.

4. The process of claim 2 wherein said recycling step comprises cooling and pelletizing the polymer.

5. The process of claim 1 including the step of heating the polymer being fed to the extruder head.

6. A device for extruding a calibrated profile of a thermoplastic polymer onto an article positioned in a processing region of an automatic handling unit, comprising:

an extruder for extruding a melted polymer, said extruder including an extruder head having a heated extrusion die with an orifice and a heated pressure hose connecting said extruder to said extruder head for supplying the melted polymer to said extrusion die; and an automatic handling unit including a controller for guiding said extruder head along a surface of the article during extrusion of the melted polymer from the extrusion die, wherein said extruder head comprises:

a) an outlet orifice other than said orifice of said extrusion die, and b) a change-over valve being movable in response to said controller and positionable for selectively directing the melted polymer to one of said extrusion die and said outlet orifice, the pressure loss during discharge through said outlet orifice of said extruder head being substantially equal to the pressure loss during discharge through said extrusion die so that the melted polymer fed to the extruder head is substantially directed to said outlet orifice.

7. The device of claim 6 wherein said change-over valve comprises a three-way valve which progressively opens a first flow path for the melted polymer to said outlet orifice as a second flow path for the melted polymer to said extrusion die is closed.

8. The device of claim 7 wherein said change-over valve comprises:

a valve plug rotatably mounted in said extruder head, said valve plug being positioned in a hollow space being larger than said valve plug and forming a part of said first flow path;

an inlet channel connected to a hollow pivot pin of said valve plug for supplying melted polymer to said valve plug, said hollow pivot pin communicating with a plug outlet of said valve plug through which melted polymer may be discharged from said valve plug, said plug outlet being offset from an axis of rotation of said valve plug such that said plug outlet moves when said valve plug is rotated;

an outlet bore connecting said hollow space with said extrusion die and forming a part of said second flow path; and an annular shoulder surrounding said bore and extending into said hollow space to sealingly engage said valve plug and seal said plug outlet from said hollow space when said plug outlet is aligned with said outlet bore so that melted polymer is discharged via said second path to said extrusion die, said shoulder being so configured that upon movement of said plug outlet out of alignment with said bore, said first flow path opens before said second flow path has closed.

9. The device of claim 7 wherein said change-over valve comprises:

a valve plug rotatably mounted in said extruder head;

an inlet channel communicatable with said valve plug for supplying melted polymer to a first channel in said valve plug;

an outlet bore connecting said first channel with said extrusion die when said valve plug is in an open position so as to form a part of said second flow path;

a second channel in said valve plug, intersecting an inlet end of said first channel and extending at an angle to said first channel, said second channel communicating with said outlet orifice to form a part of said first flow path when said valve plug is moved from said open position.

10. The device of claim 7 wherein said first flow path is constructed such that a fluid pressure loss therein substantially equals a fluid pressure loss in said second flow path.

11. The device of claim 6 including means for recycling melted polymer from said outlet orifice to said extruder.

12. The device of claim 11 wherein said recycling means includes a pump and a heated conduit.

13. The device of claim 11 wherein said recycling means includes a pelletizer.

* * * * *